United States Patent [19]
Mori et al.

[11] 4,079,306
[45] Mar. 14, 1978

[54] CURRENT GENERATING SYSTEM FOR MOTOR VEHICLE

[75] Inventors: Kazumasa Mori, Aichi; Toshio Morishima, Kariya; Katsumi Itoh, Ohbu, all of Japan

[73] Assignee: Nippondenso Co., Ltd., Kariya, Japan

[21] Appl. No.: 707,066

[22] Filed: Jul. 20, 1976

[30] Foreign Application Priority Data

Jul. 22, 1975 Japan .................................. 50-89856
Aug. 29, 1975 Japan .................................. 50-105126

[51] Int. Cl.² ........................... H02J 7/16; H02P 9/30
[52] U.S. Cl. ...................................... 322/28; 320/64; 322/60
[58] Field of Search .................... 322/28, 60, 7, 59; 320/64, 68; 310/68 D

[56] References Cited
U.S. PATENT DOCUMENTS

| | | | |
|---|---|---|---|
| 3,568,041 | 3/1971 | Arakane | 322/60 X |
| 3,621,360 | 11/1971 | Wiley | 320/64 X |
| 3,835,363 | 9/1974 | Kirk | 320/64 |

*Primary Examiner*—Robert J. Hickey
*Attorney, Agent, or Firm*—Cushman, Darby & Cushman

[57] ABSTRACT

A generator has a positive and a negative output terminals across which a battery is connected, and another output terminal for generating an output power earlier than the positive output terminal when the generator begins to generate an output power. A field energizing circuit is connected to the other output terminal and a battery voltage responsive circuit to thereby establish a field excitation when the generator begins to generate the output power at the other output terminal and when the battery voltage is below a predetermined value, whereby the field excitation can be carried out earlier and battery discharge through the field energizing circuit is prevented during the time when the engine is stopped and a key switch remains closed.

4 Claims, 2 Drawing Figures

CURRENT GENERATING SYSTEM FOR MOTOR VEHICLE

BACKGROUND OF THE INVENTION

1. Field of the Invention

The present invention relates to a current generating system for a motor vehicle, and more particularly to a polyphase alternating current generator, most commonly used as a three-phase alternating current generator, equipped with a voltage regulator for controlling the output voltage of the generator and for establishing as occasion demands an initial field excitation for the generator.

2. Brief Description of Prior Art

In a typical conventional system of this kind, the initial field excitation for the generator (current supply for a field winding of the generator) is carried out from a battery through a key switch.

When a driver forgets to make the key switch open after stopping an operating of an engine, battery energy may discharge through the field energizing circuit of the above conventional system, causing a trouble at re-starting the engine.

This trouble may take place more often for such a motor vehicle as has a diesel engine, since the key switch and an engine actuating switch are independently provided.

SUMMARY OF THE INVENTION

It is, therefore, an object of the present invention to provide an improved current generating system to overcome the above drawbacks.

It is another object of the present invention to provide a current generating system which can start current generation by residual magnetism of a generator and establish a full field excitation from a battery as soon as the generator begins to generate its output current.

It is a further object of the present invention to provide a current generating system which includes a first field energizing circuit having a great resistance value and a second field energizing circuit having a small resistance value, wherein the first field circuit is actuated for the initial field excitation when a key switch is closed and the second field circuit is actuated for the full field excitation when the generator begins to generate its output current.

These and other objects of the present invention will become more apparent by reference to the following detailed description when considered in connection with the accompanying drawings.

DETAILED DESCRIPTION OF THE PREFERRED EMBODIMENTS

Figure 1:
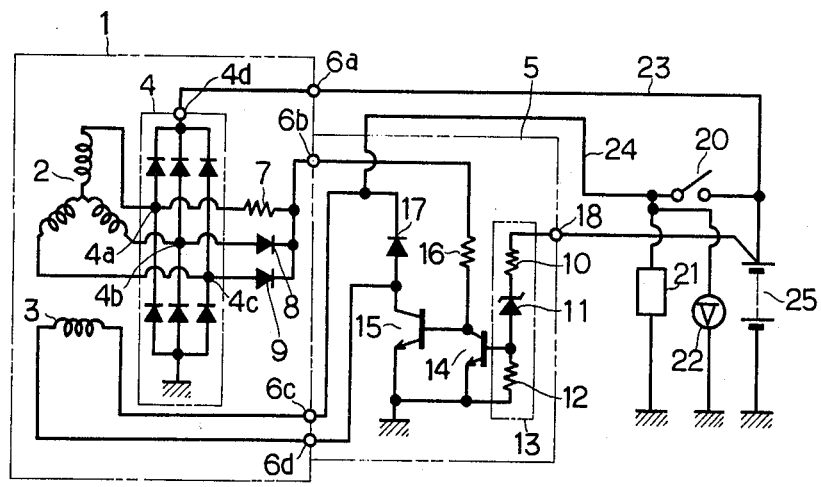
FIG. 1 is an electric wiring diagram of a current generating system according to the present invention.

Referring now to FIG. 1, numeral 1 designates a direct current power source of an alternating current generator, which is driven by an engine on a motor vehicle to supply battery charging current and other electrical loads on the vehicle. The alternator 1 includes a three phase Y-connected output winding 2 which is connected with A.C. input terminals 4a, 4b and 4c of a three phase full-wave bridge rectifier 4, and a field winding 3.

The rectifier 4 has a positive direct current terminal 4d connected to a first positive terminal 6a of the alternator 1. A second terminal 6b of the alternator 1 is connected to the A.C. input terminals 4a, 4b and 4c respectively through a resistor 7, a diode 8 and a diode 9. The alternator 1 also includes a third and a fourth terminal 6c and 6d connected across the field winding 3, through which field excitation is carried out.

A positive terminal of a battery 25 is connected to the first terminal 6a of the alternator 1 through a cable 23, by which the battery 25 on the motor vehicle is charged as the direct current is produced at the terminal 6a.

A voltage regulator 5 is connected to the alternator 1 and the battery 25 so as to control the field supply current in response to the battery voltage and thereby to control the battery voltage. The voltage regulator 5 includes a resistor 10, a zener diode 11 and a resistor 12, which are connected in series with each other, forming a battery voltage responsive circuit 13 connected across the battery 25 through a terminal 18 of the voltage regulator 5. The regulator 5 also includes a first transistor 14, a second transistor 15, a resistor 16 and a diode 17. The base of the first transistor 14 is connected with the battery voltage responsive circuit 13, so that the conduction and non-conduction of the transistor 14 is controlled by the base current caused by the voltage drop developed across the resistor 12 responding the battery voltage. The collector of the transistor 14 is connected to the second terminal 6b of the alternator 1 through the resistor 16 and the emitter thereof is grounded. The base of the second transistor 15 is connected with the collector of the first transistor 14. The collector of the second transistor 15 is connected with the fourth terminal 6d of the alternator 1 and the emitter thereof is grounded. The third terminal 6c of the alternator 1 is connected to the battery 25 through a cable 24 and a key switch 20, thus forming a field energizing circuit for supplying the field current from the battery to the field winding 3 when the transistor 15 is conductive. The diode 17 is connected across the third and the fourth terminals of the alternator 1 for absorbing the back electromotive force produced at the field winding 3 when the transistor 15 is converted from the conduction state to the non-conduction state.

An electrical load 21 such as a headlamp, radio or the like and a voltmeter 22 connected in parallel therewith are connected to the battery 25 through the key switch 20.

In operation, when the key switch 20 is closed so as to start an engine (not shown), the generator 1 begins to be rotated causing the output winding 2 to generate a small voltage by the residual magnetism of the generator 1, irrespective of the fact that no field excitation is carried by the field winding, from the battery 25 since the second transistor 15 remains cutoff at the starting of the engine.

The small voltage is converted into direct current by the combination of the negative diodes of the rectifier 4 and the resistor 7 and the diodes 8 and 9, which is applied to the second terminal 6b of the generator 1.

When the battery voltage responsive circuit 13 detects the insufficient battery voltage, the voltage drop across the resistor 12, that is the base-emitter current for the first transistor 14 is insufficient to drive it into conduction. Thus, the first transistor 14 remains turned off when the key switch 20 is closed.

The direct current applied to the second terminal 6b of the greater 1 is then supplied to the base of the second transistor 15 through the resistor 16, to complete the field energizing circuit which supplies field current from the battery 25 through the key switch 20, the cable 24, the third terminal 6c, the field winding 3, the fourth terminal 6d and the collector-emitter path of the second transistor 15. Since the base current for the second tranistor 15 is small, the field current flowing through the field winding 3 is small causing a small field excitation in the generator 1. However, the output voltage from the generator 1 is increased by the field excitation, to become sufficient to drive the second transistor 15 into a full conduction, whereby the generator 1 generates sufficient output current for the battery 25, the load 21 and so on.

The output current from the generator 1 increases in response to the increase of the engine speed and thus the battery voltage is increased. When the battery voltage exceeds a predetermined level, the sensing circuit 13 detecting the battery voltage drives the first transistor 14 into conduction. By the conduction of the transistor 14, the base potential of the second transistor 15 becomes the grounded level via the collector-emitter path of the first transistor 14, resulting in the non-conductive state of the transistor 15. This stops the supply of field current to the field winding 3 to decrease the output current from the generator 1.

When the battery voltage is decreased below the predetermined level, which is sensed by the sensing circuit 13, the first transistor becomes again non-conductive. Then, the second transistor 15 becomes conductive to again start the supply of the field current for the field winding 3, thus increasing the output current from the generator 1.

Repeating the above operation, the battery voltage is regulated at a desired level.

As noted from the above description, the subject matter of the embodiment of FIG. 1 resides in that the base of the second transistor 15 is connected to the second terminal 6b of the generator 1 to enable the generator 1 to generate output current even at a low speed rotation of the generator because a voltage signal generator comprised of the resistor 7 and the diodes 8 and 9 effectively applies even a small voltage (for example 2~3 volts) to the base of the transistor 15.

The base current for the second transistor 15 is determined by the respective resistance values of the resistors 7 and 16 and the voltage drop (around 0.6 volt) across the base-emitter of the second transistor 15. When the resistor 7 is replaced by a diode, the base current for the second transistor 15 is further determined by the voltage drop of 0.8 volt of the diode resulting in the decrease of the voltage applied to the base of the second transistor 15. In other words, with the diode in place of the resistor 7, the second transistor 15 remains turned off until the rotational speed of the generator reaches a higher level compared with that of the embodiment in FIG. 1.

According to the experimental results, the generator starts to generate output current at 4,000 to 5,000 rpm with the diode in place of the resistor 7, and the generator according to the present embodiment starts to generate the output current at the generator speed of 2,000 to 3,000 rpm.

Figure 2:
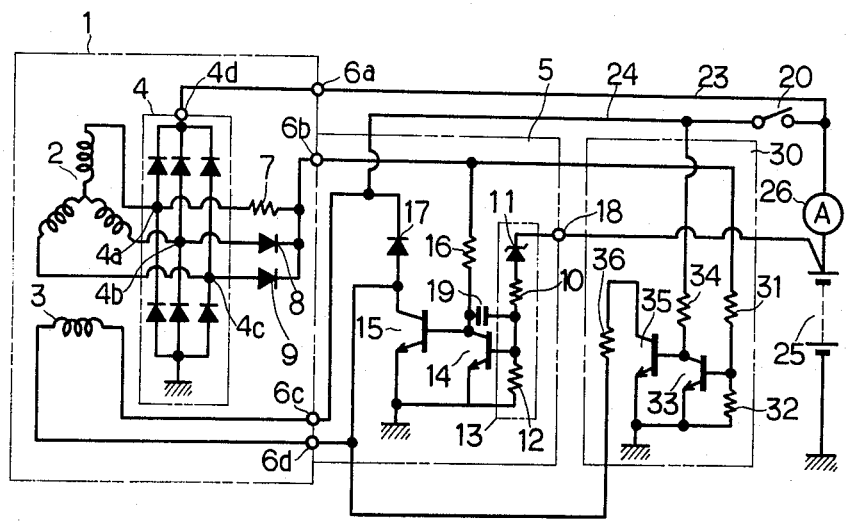
FIG. 2 is an electric wiring diagram showing another embodiment of the present invention.

Referring next to a modified embodiment of the present invention shown in FIG. 2, wherein like reference numerals designate the same or equivalent parts of FIG. 1, a capacitor 19 is connected across the base and the collector of the first transistor 14 in the voltage regulator 5 for absorbing an abrupt high voltage so as to protect the transistor 14.

An initial field excitation control circuit 30 is connected to both the voltage regulator 5 and the battery 25 to establish an initial field excitation for the generator 1 from the battery 25 when the key switch 20 is closed.

In the control circuit 30, resistors 31 and 32 are connected across the second terminal 6b of the generator 1 and the ground, with a junction of which is connected a base of a third transistor 33 so that the voltage across the second terminal 6b and the ground is divided by the resistors 31 and 32 and applied to the base of the third transistor 33.

The collector of the third transistor 33 is connected to the battery 25 through a resistor 34, the key switch 20 and an ammeter 26. The collector thereof is also connected to a base of a fourth transistor 35, so that base current therefor is supplied when the key switch 20 is closed and the third transistor 33 is in a non-conductive state. The respective emitters of the transistors 33 and 35 are grounded. The collector of the transistor 35 is connected to the fourth terminal 6d of the generator through a resistor 36 having a relatively large resistance, whereby the collector-emitter path of the transistor 35 and the resistor 36 are connected to the field winding 3 in parallel with the collector-emitter path of the second transistor 15 in the voltage regulator.

In operation, when the key switch 20 is closed current flows from the battery 25 through the ammeter 26, the switch 20 and the resistor 34 to the base of the fourth transistor 35 to drive it into conduction, since no voltage is applied to the third transistor 33 from the second terminal 6b of the generator 1 keeping the transistor 33 turned off.

And thereby current flows from the battery 25 through the ammeter 26, the switch 20, the cable 24, the third terminal 6c, the field winding 3, the fourth terminal 6d, the resistor 36 and the conductive collector-emitter path of the transistor 35 to the ground, so that the initial field excitation for the generator 1 by the field winding 3 is established from the battery 25. This field current is relatively small due to the resistor 36, however, it is enough to enable the generator 1 to begin to generate current when the generator 1 is driven by the engine (not shown).

When the alternator 1 generates three-phase alternating current at the winding 2, the current is rectified through the full-wave rectifying network 4 to direct current which would be then supplied to the battery 25 through the first terminal 6a.

At the same time, direct current is produced at the second terminal 6b by the rectification of the circuit comprising the resistor 7, the diodes 8 and 9 and the negative diodes of the rectifier network 4. The direct current at the terminal 6b is supplied through the resistor 31 to the base-emitter path of the third transistor 33 to drive it into conduction. The base current for the fourth transistor 35 from the battery 25 through the resistor 34 is then bypassed through the collector-emitter path of the turned-on transistor 33, resulting in the non-conductive state of the transistor 35. Therefore, the initial field excitation controlled by the circuit 30 is stopped when the alternator 1 begins to generate current.

The direct current produced at the second terminal 6b is also supplied to the base of the second transistor 15 in the voltage regulator 5 through the resistor 16 to make the transistor 15 conductive so that the field excitation is established by the current flowing from the battery 25 through the ammeter 26, the key switch 20, the third terminal 6c, the field winding 3, the fourth terminal 6d and the collector-emitter path of the turned-on transistor 15 to the ground instead of the circuit including the resistor 36 and the transistor 35. The above field energizing circuit including the battery 25, the field winding 3 and the collector-emitter path of the transistor 15, hereinafter referred to as a second (or full) field energizing circuit, has a smaller resistance then the aforementioned field energizing circuit including likewise the battery 25, the field winding 3, the resistor 36 and the collector-emitter path of the transistor 35, hereinafter referred to as an first (or initial) field energizing circuit. When this second (full) field energizing circuit is established, a large amount of field current flows through the field winding 3 so that the generator 1 generates a sufficient electric energy to charge the battery 25 and to supply the other electrical loads.

When the battery voltage increases above a set level of the voltage responsive circuit 13, the zener diodes becomes conductive to drive the transistor 14 into conduction. The transistor 15 is then made nonconductive, stopping the field excitation. The generator 1 decreases the output power because of the stoppage of the field excitation. When the battery voltage becomes below the set level of the voltage responsive circuit 13, the first transistor 14 is again converted into the nonconductive state and the second transistor 15 is in turn driven into conduction so as to establish the field excitation. Repeating the above operation, the battery voltage is regulated at a desired level.

When the engine is stopped but the key switch 20 remains closed, the generator stops generating the output power at the first and second terminals 6a and 6b. As the second and third transistor 15 and 33 are both kept turned-off, the fourth transistor 35 is turned on owing to the base current from the battery 25 through the key switch 20. Therefore, current flows from the battery 25 through the key switch 20, the field winding 3, the resistor 36 and the collector-emitter path of the fourth transistor 35 to the ground, however the amount of the current is very small because of the resistor 36, whereby the excessive consumption of the electric energy on the battery can be prevented.

In the above-explained embodiments, one diode with a capacitor for smoothing the output from the diode may be employed instead of the resistor 7 and the diodes 8 and 9, or the diode 8 or 9 can be eliminated.

Further in the embodiments, the voltage responsive circuit 13 may be connected to the cable 24 between the key switch 20 and the third terminal 6c to prevent the energy consumption from the battery 25 at the circuit 13 during the time when the generator does not generate the output power, that is when the engine is stopped. For the same purpose, the voltage responsive circuit 13 may be connected to the second terminal 6b of the generator 1.

What is claimed is:

1. A current generating system comprising:
an alternating current generator including an output winding and a field winding;
a full-wave rectifying network having positive and negative direct current output terminals and AC input terminals connected to said output winding;
a battery connected across said direct current output terminals;
a voltage regulator including a voltage responsive circuit responsive to the output voltage of said generator, a first switching transistor having a base connected to said voltage responsive circuit, and a second switching transistor having a base connected to a collector of said first switching transistor, the collector-emitter path of said second transistor being connected to said battery through said field winding;
a resistor connected at one end to one of said AC input terminals; and
a diode connected at one end to the other of said AC input terminals, the other ends of said resistor and diode being connected to the collector of said first switching transistor and the base of said second switching transistor, wherein said base of said second switching transistor is electrically isolated from said positive direct current terminal, whereby the field excitation can be carried out by current flow from said battery through said field winding and said collector-emitter path of said second switching transistor only when said voltage responsive circuit senses insufficient voltage and said generator is generating output voltage.

2. A current generating system comprising:
an alternating current generator including an output winding and a field winding;
a full-wave rectifying network having direct current output terminals and AC input terminals connected to said output winding;
a battery connected across said direct current output terminals;
a voltage regulator including a voltage responsive circuit connected to said battery, a first switching transistor having a base connected to said voltage responsive circuit, and a second switching transistor having a base connected to a collector of said first switching transistor, the collector-emitter path of said second transistor being connected to said battery through said field winding;
a resistor connected at one end to one of said AC input terminals;
a diode connected at one end to the other of said AC input terminals, the other ends of said resistor and diode being connected to the collector of said first switching transistor;
a third transistor having a collector, an emitter and a base;
a fourth transistor having a collector, an emitter and a base;
first conductor means for connecting said resistor and diode with the base of said third transistor;
second conductor means for connecting the collector of said third transistor with said battery;
third conductor means for connecting the base of said fourth transistor with said collector of said third transistor; and
a resistor connected between the collector of said fourth transistor and said field winding.

3. A current generating system comprising:
a generator having an output winding and a field winding;

a rectifying device having a first and a second positive direct current output terminal, a negative direct current terminal, AC input terminals connected to said output winding, and a resistor and a diode connected between said AC input terminals and said second direct current terminal;

a battery connected across said positive direct current terminal and negative direct current terminal;

a key switch;

an initial field energizing circuit connected across said battery and including said field winding for establishing an initial field excitation for said generator when said key switch is closed, said initial field energizing circuit having a relatively large resistance;

means connected between said second positive direct current terminal and said initial field energizing circuit for stopping said initial excitation when said generator begins to generate current;

a voltage responsive circuit connected to said battery; and a full field energizing circuit connected across said battery and including said field winding and a switching transistor, the base thereof being not only connected to said voltage responsive circuit and said second positive direct current terminal but also electrically isolated from said first positive direct current terminal for establishing a full field exciation from said battery when the battery voltage detected at said voltage responsive circuit is below a predetermined value and when said generator begins to generate current.

4. A current generating system comprising:

a generator having an output winding and a field winding;

a rectifying device having a positive and a negative direct current terminal, AC input terminals connected to said output winding, a signal terminal, and a resistor and a diode connected between said AC input terminals and said signal terminal, said signal terminal generating a voltage signal earlier than said positive direct current terminal when said generator begins to generate output power;

a battery connected across said positive and negative direct current terminals;

a voltage responsive circuit responsive to the output voltage of said generator; and a field energizing circuit connected across said battery and including said field winding and a switching transistor connected in series therewith, the base of said transistor being not only connected to said signal terminal of said rectifying device and said voltage responsive circuit but also electrically isolated from said positive direct current terminal, for establishing a field excitation from said battery for said generator when said generator begins to generate output power and when the output voltage detected at said voltage responsive circuit is below a predetermined value.

* * * * *